(12) United States Patent
Tamane et al.

(10) Patent No.: US 10,703,335 B2
(45) Date of Patent: Jul. 7, 2020

(54) KEY UNIT AND VEHICLE HAVING KEY UNIT

(71) Applicants: Toyota Jidosha Kabushiki Kaisha, Toyota-shi Aichi-ken (JP); Nomura Research Institute, Ltd., Tokyo (JP); Kabushiki Kaisha Tokai Rika Denki Seisakusho, Niwa-gun, Aichi (JP)

(72) Inventors: Yasuyuki Tamane, Miyoshi (JP); Tsukasa Takahashi, Tokyo (JP); Masaki Oshima, Aichi-ken (JP)

(73) Assignees: Toyota Jidosha Kabushiki Kaisha, Toyota-shi, Aichi-ken (JP); Nomura Research Institute, Ltd., Tokyo (JP); Kabushiki Kaisha Tokai Rika Denki Seisakusho, Niwa-gun, Aichi (JP)

( * ) Notice: Subject to any disclaimer, the term of this patent is extended or adjusted under 35 U.S.C. 154(b) by 0 days.

(21) Appl. No.: 16/135,376

(22) Filed: Sep. 19, 2018

(65) Prior Publication Data

US 2019/0118771 A1    Apr. 25, 2019

(30) Foreign Application Priority Data

Oct. 23, 2017  (JP) .................................. 2017-204757

(51) Int. Cl.
*B60R 25/22*    (2013.01)
*E05B 49/00*    (2006.01)
(Continued)

(52) U.S. Cl.
CPC .......... *B60R 25/241* (2013.01); *B60R 25/225* (2013.01); *B60R 25/24* (2013.01);
(Continued)

(58) Field of Classification Search
None
See application file for complete search history.

(56) References Cited

U.S. PATENT DOCUMENTS

| 2013/0184032 | A1* | 7/2013 | Choi | H04M 1/0264 |
| | | | | 455/556.1 |
| 2016/0350992 | A1* | 12/2016 | Telljohann | H04W 4/70 |
| 2018/0009416 | A1* | 1/2018 | Maiwand | G07C 9/00182 |

FOREIGN PATENT DOCUMENTS

| JP | 2006118122 A | 5/2006 |
| JP | 2006121278 A | 5/2006 |

\* cited by examiner

*Primary Examiner* — Daniell L Negron
(74) *Attorney, Agent, or Firm* — Dinsmore & Shohl LLP (57) ABSTRACT

A key unit authenticates a portable terminal based on information acquired from the portable terminal and controls locking and unlocking of a target by transmitting a signal to a locking and unlocking device. The key unit includes: a first communication unit configured to receive a request signal transmitted in a first frequency band from the locking and unlocking device; a controller configured to authenticate the portable terminal and process signals transmitted to and received from the locking and unlocking device; a second communication unit configured to perform short-range wireless communication with the portable terminal in a second frequency band; and a substrate on which the first communication unit, the controller, and the second communication unit are mounted. The first communication unit and the second communication unit are mounted at positions facing each other across the controller, on the substrate.

15 Claims, 8 Drawing Sheets

(51) Int. Cl.
*B60R 25/24* (2013.01)
*G07C 9/00* (2020.01)
*B60R 25/10* (2013.01)

(52) U.S. Cl.
CPC .......... *E05B 49/00* (2013.01); *G07C 9/00309* (2013.01); *G07C 9/00571* (2013.01); *B60R 25/10* (2013.01)

KEY UNIT AND VEHICLE HAVING KEY UNIT

CROSS-REFERENCE TO RELATED APPLICATIONS

The present disclosure claims priority to Japanese Patent Application No. 2017-204757 filed on Oct. 23, 2017, which is incorporated herein by reference in its entirety including the specification, drawings and abstract.

BACKGROUND

1. Technical Field

The disclosure relates to a key unit which performs locking and unlocking and a vehicle having a key unit.

2. Description of Related Art

A key management system is known, in which authentication information for unlocking a vehicle is acquired by a portable terminal from a server device via a network and the portable terminal can be used as an electronic key (Japanese Unexamined Patent Application Publication No. 2006-118122 (JP 2006-118122 A)). In the system, the vehicle has means for reading an integrated circuit (IC) tag, and unlocking is performed using the portable terminal and the IC tag in which key information is written. Japanese Unexamined Patent Application Publication No. 2006-121278 (JP 2006-121278 A) discloses a communication system which performs remote control of locking and unlocking of a vehicle.

SUMMARY

Vehicles on sale have smart key systems. The smart key system gives an identifier (ID) unique to a portable device (electronic key) that performs wireless communication with a vehicle, and enables door unlocking and engine starting in a case where the ID obtained by the communication matches an ID registered in the vehicle in advance. A system that enables locking and unlocking of the vehicle by a portable terminal without remodeling the vehicle by using the smart key system is being studied.

For example, a key unit having a role of the electronic key is installed in the vehicle and a validity/invalidity of the electronic key is switched based on the result of authentication performed via the wireless communication. In doing so as described above, it becomes possible to lock and unlock the vehicle using the portable terminal such as a smartphone.

The smart key system uses radio waves in a long wave band for polling from a vehicle side and uses radio waves in an ultra-high frequency band for transmitting a response signal to the vehicle side. Therefore, in the key unit using the smart key system, it is needed to mount a circuit (low frequency (LF) circuit) that receives radio waves in a low frequency band and a circuit (radio frequency (RF) circuit) that transmits radio waves in a high frequency band. In addition, a circuit that performs the wireless communication with the portable terminal, and a unit that supplies power to the circuit are also needed. That is, in a case of designing the key unit using the smart key system, it is desirable to appropriately dispose the circuits.

The disclosure provides a key unit in which parts are optimally disposed and which controls locking and unlocking of a target and a vehicle having a key unit.

A first aspect of the disclosure relates to a key unit configured to authenticate a portable terminal based on information acquired from the portable terminal and control locking and unlocking of a target by transmitting a signal to a locking and unlocking device. In a case where the target is a vehicle, the locking and unlocking device is mounted on the vehicle and controls the locking and unlocking of a door. The key unit is installed inside the vehicle and transmits the signal to the locking and unlocking device based on the result of the authentication of the portable terminal. The signal may be a signal used in a smart key system.

The key unit according to the first aspect of the disclosure includes: a first communication unit configured to receive a request signal transmitted in a first frequency band from the locking and unlocking device; a controller configured to authenticate the portable terminal and process signals transmitted to and received from the locking and unlocking device; a second communication unit configured to perform short-range wireless communication with the portable terminal in a second frequency band; and a substrate on which the first communication unit, the controller, and the second communication unit are mounted. The first communication unit and the second communication unit are mounted at positions facing each other across the controller, on the substrate.

The key unit according to the first aspect of the disclosure receives the request signal transmitted in the first frequency band from the locking and unlocking device, and communicates with the portable terminal using the second frequency band. That is, since a plurality of communication units having different frequency bands is mounted on the same substrate, and mutually receive influences of noises depending on a disposing method of a circuit and a frequency band, sensitivity is lowered when the communication is performed.

Therefore, according to the first aspect of the disclosure, the first communication unit that uses the first frequency band and the second communication unit that uses the second frequency band are disposed at the positions facing each other across the controller. According to such a configuration, first, since units for transmitting and receiving radio waves in the different frequency bands can be disposed physically apart from each other, it is possible to suppress the influence of the noise. Secondly, a distance between the controller and the first communication unit, and a distance between the controller and the second communication unit can be made relatively short. That is, a better communication sensitivity can be obtained.

In the key unit according to the first aspect of the disclosure, the second frequency band may be a frequency band higher than the first frequency band.

The key unit according to the first aspect of the disclosure may further include: a power supply circuit mounted on the substrate. The first communication unit and the power supply circuit may be mounted at positions facing each other across the controller, on the substrate.

By disposing the power supply circuit at such a position, the influence of the noise generated from the power supply circuit on the first communication unit can be suppressed. The positional relationship between the power supply circuit and the second communication unit is not particularly limited.

In the key unit according to the first aspect of the disclosure, the second communication unit may have an antenna. The second communication unit may be mounted on the substrate such that the antenna is on an outer edge side of the substrate.

According to the first aspect of the disclosure, by disposing the antenna used by the second communication unit on the outer edge side of the substrate, the distance to the first communication unit can be maintained.

In the key unit according to the first aspect of the disclosure, at least a part of the controller may be disposed on a straight line connecting the center point of the first communication unit and the center point of the second communication unit.

In the key unit according to the first aspect of the disclosure, at least a part of the controller may be disposed in a region where both of the first communication unit and the second communication unit are inscribed.

By disposing the first communication unit and second communication unit at such positions facing each other across the controller, the first communication unit and second communication unit can be disposed apart from each other.

In the key unit according to the first aspect of the disclosure, at least a part of the first communication unit may be disposed inside a region surrounded by both end points of a first side of the controller, and both end points of a side of the substrate which is on a side of the first side and faces the first side. At least a part of the second communication unit may be disposed inside a region surrounded by both end points of a second side of the controller parallel to the first side of the controller, and both end points of a side of the substrate which is on a side of the second side and faces the second side.

In the key unit according to the first aspect of the disclosure, at least a part of the first communication unit may be disposed inside a rectangular region having opposite sides, one side being a first side of the controller, and the other side being a side of the substrate which faces the first side of the controller and is on a side of the first side. At least a part of the second communication unit may be disposed inside a rectangular region having opposite sides, one side being a second side of the controller parallel to the first side of the controller, and the other side being a side of the substrate which faces the second side and is on aside of the second side.

According to the first aspect of the disclosure, the aspect can be suitably applied to an embodiment in which the locking and unlocking of the vehicle is controlled by using an existing smart key system.

In the key unit according to the first aspect of the disclosure, the first frequency band may be a long wave band.

The first aspect of the disclosure can be suitably applied to a system that transmits the request (polling) signal by the radio waves in the long wave band (30 kHz to 300 kHz).

The first aspect of the disclosure can be specified as a key unit including at least some of the structure. The embodiment of the disclosure can be specified as a locking and unlocking system including the key unit. The processing and the structure can be freely combined and implemented without technical inconsistency.

A second aspect of the disclosure relates to a vehicle. The vehicle includes the key unit according to the first aspect of the disclosure; and a locking and unlocking device configured to transmit the request signal in the first frequency band to the key unit, and to control locking and unlocking of the vehicle by a smart key system that receives a response signal transmitted from the key unit in the second frequency band which is a frequency band higher than the first frequency band, the locking and unlocking device being mounted on the vehicle.

According to the aspects of the disclosure, it is possible to dispose the parts optimally in the key unit that controls the locking and unlocking of the target and the vehicle having a key unit.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

System Outline

Figure 1:
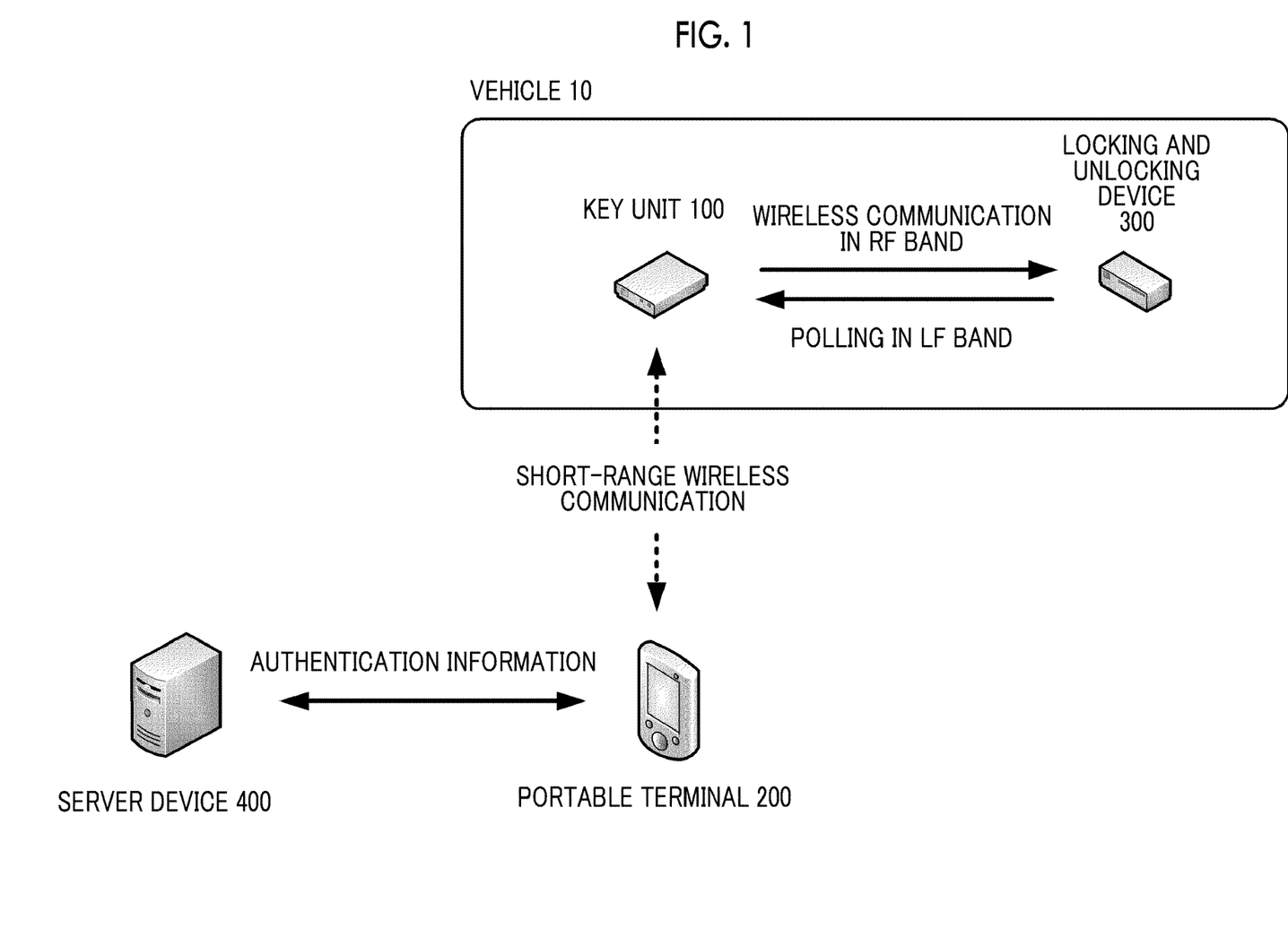
FIG. 1 is a system outline diagram of a locking and unlocking system according to an embodiment.

An outline of a locking and unlocking system according to the embodiment will be described with reference to FIG. 1. The locking and unlocking system according to the embodiment is configured to include a key unit 100 and a locking and unlocking device 300 mounted on a vehicle 10, a portable terminal 200, and a server device 400. In the locking and unlocking system according to the embodiment, the key unit 100 has the same wireless interface as an electronic key (portable device) of a smart key, and it is possible to control locking and unlocking of the vehicle without using a physical key by communicating with the existing locking and unlocking device 300. The key unit 100 performs short-range wireless communication with the portable terminal 200 and determines whether or not the key unit 100 plays a role of an electronic key of the vehicle 10 based on the result of authenticating the portable terminal 200. That is, a user of the system can control the locking and unlocking of the vehicle by manipulating the portable terminal 200 from the outside of the vehicle 10.

System Configuration

Figure 2:
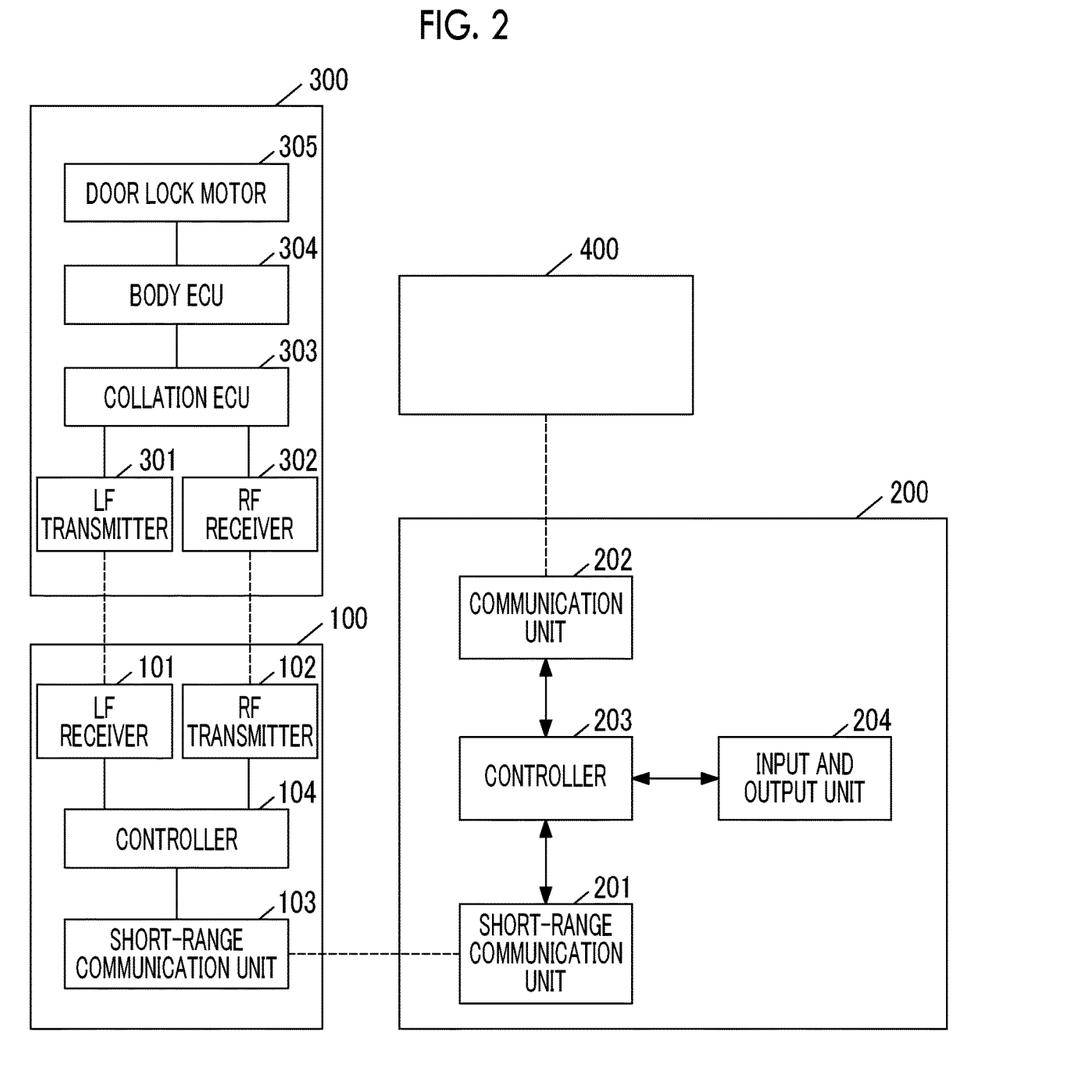
FIG. 2 is a block diagram schematically showing an example of components of the locking and unlocking system.

Components of the system will be described in detail. FIG. 2 is a block diagram schematically showing an example of the configuration of the key unit 100, the portable terminal 200, the locking and unlocking device 300, and the server device 400 shown in FIG. 1. Among the components of the system, the key unit 100 and the locking and unlocking device 300 are mounted on the vehicle 10 which is a target of locking and unlocking (to be locked and to be unlocked).

The locking and unlocking device 300 is a device locking and unlocking a door of the vehicle, and is an existing device constituting a part of a smart key system. Specifically, the door of the vehicle 10 is locked and unlocked according to a locking signal and an unlocking signal transmitted from the electronic key possessed by the user of the vehicle (hereinafter referred to as a portable device) via the radio waves in a high frequency (radio frequency, hereinafter referred to as RF) band. A function of transmitting the radio waves in a low frequency (hereinafter referred to as LF) band for checking the portable device is included.

In the embodiment, the key unit 100 transmits and receives the radio waves in the RF band and the LF band instead of the portable device possessed by the user so as to control the locking and unlocking of the door of the vehicle. Hereinafter, unless otherwise noted, a description will be made with a communication destination of the locking and unlocking device 300 being limited to the key unit 100.

The locking and unlocking device 300 is configured to include an LF transmitter 301, an RF receiver 302, a collation ECU 303, a body ECU 304, and a door lock motor 305. The locking and unlocking device 300 operates by power supplied from an auxiliary battery (not shown) mounted on the vehicle 10.

The LF transmitter 301 transmits the radio waves in the low frequency band (first frequency band in the aspects of the disclosure. For example, 100 KHz to 300 KHz) for checking (polling) the key unit 100. For example, the LF transmitter 301 is built in the vicinity of a center console or a steering wheel in a vehicle cabin.

The RF receiver 302 receives the radio waves in the high frequency band (second frequency band in the aspects of the disclosure. For example, 100 MHz to 1 GHz) transmitted from the key unit 108. The RF receiver 302 can be built in any place in the vehicle cabin.

The collation ECU 303 is a computer that performs control to lock and unlock the door of the vehicle 10, based on the signal (locking signal or unlocking signal) transmitted from the key unit 100 via the radio waves in the RF band. The collation ECU 303 is constituted by, for example, a microcomputer. In the following description, the locking signal and the unlocking signal are collectively referred to as the locking and unlocking signals. The term "locking and unlocking signals" represents at least one of the locking signal and the unlocking signal.

Figure 3:
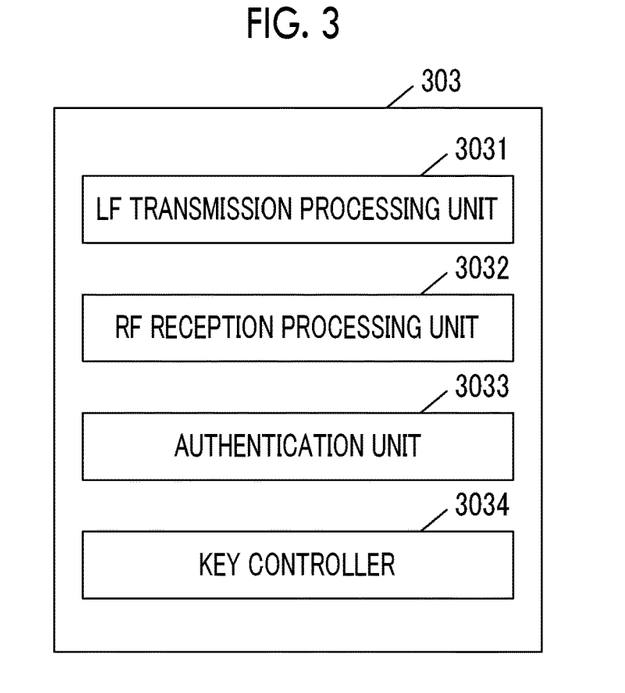
FIG. 3 is an example of units included in a collation electronic control unit (ECU)

FIG. 3 shows units included in a collation ECU 303. Each of the units shown in FIG. 3 may be realized by executing a program stored in storage unit such as a read only memory (ROM) by a central processing unit (CPU) (none of which is shown).

An LF transmission processing unit 3031 performs control to transmit a polling signal (request signal in the aspects of the disclosure) to the vehicle cabin as the radio waves in the LF band via the LF transmitter 301. An RF reception processing unit 3032 performs control to receive the locking and unlocking signals (response signal in the aspects of the disclosure) transmitted from the key unit 100 as the radio waves in the RF band via the RF receiver 302. An authentication unit 3033 authenticates whether or not the locking and unlocking signals transmitted from the key unit 100 is transmitted from a legitimate device. Specifically, a determination is made whether or not a key ID included in the locking and unlocking signals matches a key ID stored in advance in the storage unit (not shown) of the collation ECU 303. Specific details will be described later.

A key controller 3034 transmits an unlocking command or a locking command to the body ECU 304, which will be described later, based on the result of the authentication performed by the authentication unit 3033. The signal is transmitted via an in-vehicle network such as a controller area network (CAN).

The body ECU 304 is a computer that controls the body of the vehicle. The body ECU 304 has a function of unlocking and locking the door of the vehicle by controlling a door lock motor 115 described later, based on the received unlocking command or locking command. The body ECU 304 may further have a function of controlling components associated with the vehicle body such as a power window control, a seat adjustment, an anti-theft, a seatbelt control, and a headlight control.

The door lock motor 305 is an actuator that locks and unlocks the door of the vehicle 10 (including a trunk as well as a door for getting on and off and a rear gate). The door lock motor 305 operates based on a signal transmitted from the body ECU 304.

The key controller 3034 may transmit solely information that the authentication is successful to the body ECU 304 instead of the unlocking command or the locking command. According to such a configuration, it is possible to cause the locking or unlocking operation to be performed with the action by the user (for example, pressing of an unlocking button, and touching of a door knob) as a trigger.

The key unit 100 will be described. The key unit 100 is a device disposed inside the vehicle 10, and has a function of authenticating the portable terminal 200 by performing short-range wireless communication with the portable terminal 200, and a function of transmitting the locking and unlocking signals using the radio waves in the RF band, based on the result of authenticating the portable terminal 200. The key unit 100 is configured to include an LF receiver 101, an RF transmitter 102, a short-range communication unit 103, and a controller 104.

In the embodiment, the key unit 100 is disposed at a predetermined position in the vehicle cabin (for example, in a glove compartment), and operates by the power supplied from the auxiliary battery (not shown) mounted on the vehicle 10.

The LF receiver 101 (first communication unit in the aspects of the disclosure) receives the polling signal transmitted from the locking and unlocking device 300 via the radio waves in the LF band. The LF receiver 101 has an antenna (hereinafter referred to as an LF antenna) that receives the radio waves in the LF band.

The RF transmitter 102 transmits the locking and unlocking signals to the key unit 100 via the radio waves in the RF band.

The short-range communication unit 103 (second communication unit in the aspects of the disclosure) communicates with the portable terminal 200 possessed by the user. The short-range communication unit 103 performs the communication in a short range (to the extent that the communication can be performed inside and outside the vehicle cabin) using a predetermined wireless communication standard.

In the embodiment, the short-range communication unit 103 performs the data communication by Bluetooth (registered trademark) Low Energy standard (hereinafter referred to as BLE). The BLE is a low power communication standard based on Bluetooth, and has a feature that the communication can be started immediately by detecting a partner without requiring pairing between the devices. In the embodiment, the BLE is exemplified, but the other wireless communication standards can also be used. For example, near-field communication (NFC), ultra-wide band (UWB), WiFi (registered trademark) can be used.

The controller 104 (controller in the aspects of the disclosure) performs the short-range wireless communication with the portable terminal 200 via the short-range communication unit 103, performs control to authenticate the portable terminal 200, and performs control to transmit the locking and unlocking signals based on the authentication result. The controller 104 is constituted by, for example, a microcomputer.

Figure 4:
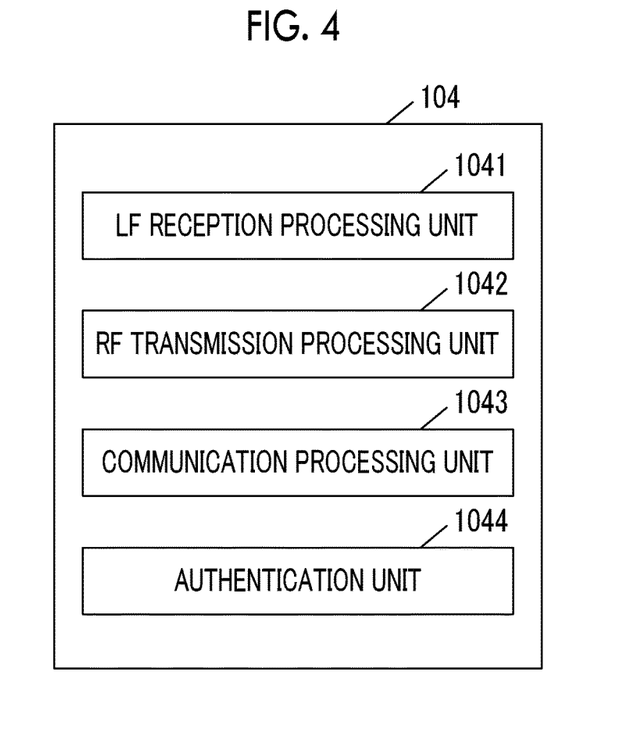
FIG. 4 is an example of units included in a controller.

The units included in the controller 104 are shown in FIG. 4. Each of the units shown in FIG. 4 may be realized by executing the program stored in the storage unit (ROM or the like) by the CPU (none of which are shown).

An LF reception processing unit 1041 performs control to receive the polling signal transmitted from the locking and unlocking device 300 as the radio waves in the LF band via the LF receiver 101. An RF transmission processing unit 1042 performs control to transmit the locking and unlocking signals as the radio waves in the RF band via the RF transmitter 102. The locking and unlocking signals are generated by a communication processing unit 1043 described later, in a case where an authentication unit 1044 described later successfully authenticates the portable terminal 200.

The communication processing unit 1043 processes the communication with the portable terminal 200 via the short-range communication unit 103. Specifically, the communication processing unit 1043 receives a locking request or an unlocking request (hereinafter collectively referred to as locking and unlocking requests) from the portable terminal 200, and generates the locking and unlocking signals according to the received request. The generated locking and unlocking signals are temporarily stored, and are output at a timing when the authentication unit 1044 described later successfully authenticates the portable terminal 200.

The authentication unit 1044 authenticates the portable terminal 200 based on authentication information included in the locking and unlocking requests transmitted from the portable terminal 200. Specifically, the authentication information stored in the storage unit (not shown) is compared with the authentication information transmitted from the portable terminal 200, and in a case where both pieces of the authentication information match, determination is made that the authentication is successful. In a case where both pieces of the authentication information do not match, determination is made that the authentication failed. In a case where the authentication unit 1044 successfully authenticates the portable terminal 200, the locking and unlocking signals generated by the communication processing unit 1043 is output to the RF transmission processing unit 1042, and wirelessly transmitted to the kicking and unlocking device 300. An authentication method performed by the authentication unit 1044 may be a method of simply comparing pieces of authentication information to verify the identity or a method using asymmetric encryption. Hereinafter, the authentication information stored in the key unit 100 is referred to as device authentication information, and the authentication information transmitted from the portable terminal 200 is referred to as terminal authentication information, as necessary for description.

In the embodiment, the authentication unit 1044 is set to generate a transmission trigger of the locking and unlocking signals; however, the authentication unit 1044 may control a power supply of the key unit 100 based on the authentication status. For example, in a situation where authentication of the portable terminal 200 is not performed, all the components except the communication processing unit 1043 and the authentication unit 1044 are set to be in a suspend state, and in a case where the authentication is successful, in a predetermined period (for example, until the response from the locking and unlocking device 300 to the transmitted locking and unlocking signals is made), all the components may be in an energized state. As long as the locking and unlocking signals can be transmitted solely in a case where the authentication is successful, the method to realize the authentication is not limited.

The key unit 100 simultaneously transmits the locking and unlocking signals and the ID of the electronic key (hereinafter referred to as key ID) to the locking and unlocking device 300. The key ID may be stored in advance in the key unit 100 in a plaintext state or may be stored in a state encrypted by a cryptogram unique to the portable terminal 200. In the case where the key ID is encrypted and stored, by the authentication information transmitted from the portable terminal 200, the encrypted key ID may be decrypted to obtain the original key ID.

The portable terminal 200 will be described. The portable terminal 200 is a small computer such as a smartphone, a mobile phone, a tablet terminal, a personal information terminal, and a wearable computer (smartwatch or the like). The portable terminal 200 is configured to include a short-range communication unit 201, a communication unit 202, a controller 203, and an input and output unit 204.

The short-range communication unit 201 communicates with the key unit 100 according to the same communication standard as the short-range communication unit 103. The communication unit 202 connects the portable terminal 200 to a network. In the embodiment, it is possible to communicate with the other device (for example, the server device 400) via the network by using a mobile communication service such as Third Generation (3G) and Long Term Evolution (LTE).

The controller 203 is a computer that controls the portable terminal 200. The controller 203 performs, for example, processing of generating the locking and unlocking requests, processing of acquiring the terminal authentication information, and processing of transmitting the locking and unlocking requests and the terminal authentication information to the key unit 100. The controller 203 is constituted by, for example, a microcomputer. The controller 203 may realize the functions such as the processing by executing the program stored in the storage unit (ROM or the like) by the CPU (none of which is shown).

The controller 203 interacts with the user via the input and output unit 204. The input and output unit 204 receives an input manipulation performed by the user and presenting information to the user. Specifically, the input and output unit is constituted by a touch panel, control unit of the touch panel, a liquid crystal display, and control unit of the liquid crystal display. In the embodiment, the touch panel and the liquid crystal display are configured to be a single touch panel display.

The controller 203 displays a manipulation screen on the input and output unit 204, and generates the unlocking request or the locking request based on the manipulation performed by the user. For example, the controller 203 outputs an icon for unlocking, and an icon for locking to the touch panel display, and generates the unlocking request or the locking request based on the manipulation performed by the user. The manipulation performed by the user is not limited to the operation via the touch panel display. For example, the operation may be an operation via a hardware switch.

The controller 203 performs the processing of acquiring the terminal authentication information. In the embodiment, the terminal authentication information is generated in the server device 400 and transmitted to the portable terminal 200 via the communication unit 202. In a case where the portable terminal 200 does not have the terminal authentication information, the locking manipulation and the unlocking manipulation from the manipulation screen are not possible.

The terminal authentication information acquired by the portable terminal 200 may be for an unchanging key or for a one-time key. In either case, the device authentication information corresponding to the terminal authentication information is stored in advance in the key unit 100.

Outline of Locking and Unlocking Device

Before the detailed description of the system, the outline of the operation performed by the existing locking and unlocking device 300 will be described. The locking and unlocking device 300 is a device constituting a normal smart key system, and communicates with the portable device possessed by the user so as to detect that the portable device is in the vicinity of the vehicle or inside the vehicle cabin. As described above, in the embodiment, the key unit 100 plays a role of a portable device.

More specifically, the collation ECU 303 transmits the polling signal to the inside and outside of the vehicle at a predetermined period via the LF transmitter 301, and receives a return signal transmitted by the key unit 100 in response to the polling signal. The key ID unique to the key unit 100 is included in the return signal, and the registered key ID of the key unit 100 is stored in the collation ECU 303. The collation ECU 303 performs the authentication processing of the key unit 100 by using the received key ID and the stored key ID. In a case where the key unit 100 is successfully authenticated, the body ECU 304 is notified that the authentication is successful, and it is possible to cause the vehicle to perform a predetermined operation (for example, door unlocking, cancellation of the immobilizer) as the above description.

The communication and the processing performed between the locking and unlocking device 300 and the key unit 100 has been described above. In the locking and unlocking system according to the embodiment, the key unit 100 installed in the vehicle transmits the key ID to the locking and unlocking device 300 instead of the portable device, and thus it is possible to lock and unlock the vehicle without using the portable device.

Operation of System

Figure 5:
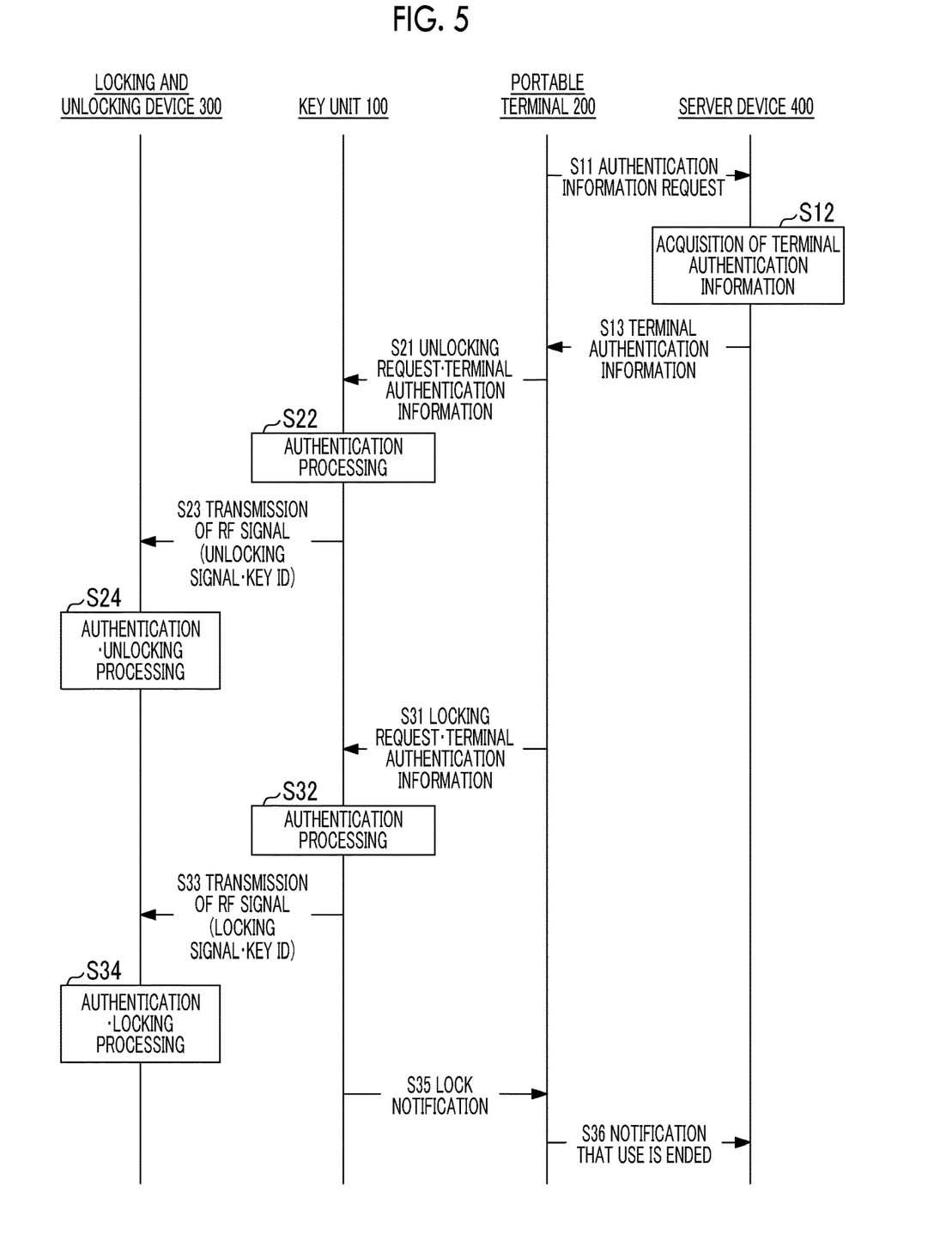
FIG. 5 is a flowchart of data and processing between the components.

The operation of the locking and unlocking system according to the embodiment will be described with reference to FIG. 5. FIG. 5 is a flowchart for describing data transmitted and received between the components and the processing performed by each of the components.

First, in step S11, the portable terminal 200 requests the server device 400 to issue terminal authentication information. The terminal authentication information described here is not information for the locking and unlocking device 300 to authenticate the key unit 100, and is information for the key unit 100 to authenticate the portable terminal 200. When the portable terminal 200 transmits the information identifying the terminal to the server device 400, the server device 400 acquires the terminal authentication information unique to the portable terminal 200 (step S12), and transmits the acquired terminal authentication information to the portable terminal 200 (step S13). As described above, it is possible to perform the manipulation of unlocking the vehicle 10 by the portable terminal 200. Since the processing in steps S11 to S13 is preparation processing for the control of the locking and unlocking, the processing is not particularly limited, and it is useful to perform the processing in advance.

Steps S21 to S24 are processing for unlocking the vehicle 10 using the portable terminal 200. When the user of the portable terminal 200 performs the manipulation to unlock the vehicle 10 via the input and output unit 204, the portable terminal 200 transmits the unlocking request and the terminal authentication information to the key unit 100 in step S21. In step S22, the key unit 100 compares the terminal authentication information transmitted from the portable terminal 200 with the device authentication information stored in advance, and performs the authentication processing.

In a case where the authentication succeeds, the key unit 100 transmits the unlocking signal and the key ID to the locking and unlocking device 300 in step S23. Then, in step S24, the locking and unlocking device 300 performs the authentication processing based on the received key ID. As a result, in a case where the authentication succeeds, the door of the vehicle 10 is unlocked. At this time, an answer-back or the like may be performed.

Steps S31 to S36 are processing for locking the vehicle 10 using the portable terminal 200. When the user of the portable terminal 200 performs the manipulation of locking the vehicle 10 via the touch panel screen, the portable terminal 200 transmits the locking request and the terminal authentication information to the key unit 100 in step S31. Then, in step S32, the key unit 100 compares the terminal authentication information transmitted from the portable terminal 200 with the device authentication information stored in advance, and performs the authentication processing.

In case of where the authentication succeeds, the key unit 100 transmits the locking signal and a key ID to the locking and unlocking device 300 in step S33. Then, in step S34, the locking and unlocking device 300 performs the authentication processing based on the received key ID. As a result, in a case where the authentication succeeds, the door of the vehicle 10 is locked.

After the transmission of the locking signal, the key unit 100 transmits a notification (lock notification) that the locking is completed to the portable terminal 200 (step S35). As described above, a notification that the locking is completed is output to the touch panel screen of the portable terminal 200. In a case where the authentication information is for a one-time key, the one-time key may be invalidated at the timing of step S35. The portable terminal 200 generates a notification that the use of the system is ended, and transmits the notification to the server device 400 (step S36).

Design issues of the key unit 100 will be described. As described above, the key unit 100 is configured to include the LF receiver 101, the RF transmitter 102, and the short-range communication unit 103. Among the components, the LF receiver 101 that receives the polling signal from the locking and unlocking device 300 and the short-range communication unit 103 that communicates in response to the request from the portable terminal 200 performs the communication respectively at independent timings.

The problem that arises here is a communication defect that occurs when noise generated in the short-range communication unit 103 wraps around the LF receiver 101. As described above, the LF receiver 101 receives the radio waves in the long wave band, and therefore is particularly susceptible to the noise. The noise is typically generated from the short-range communication unit 103, and the noise is generated from a power supply circuit as well. When the noise enters, there is a possibility that the polling signal may not be correctly received.

In order to solve the above problem, in the key unit 100 according to the embodiment, the short-range communication unit 103 that transmits and receives the radio waves in the high frequency band and the LF antenna that receives the radio waves in the low frequency band are disposed at positions facing each other across the microcomputer which is the controller 104. The power supply circuit and the LF antenna are disposed at positions facing each other across the microcomputer which is the controller 104.

Figure 6:
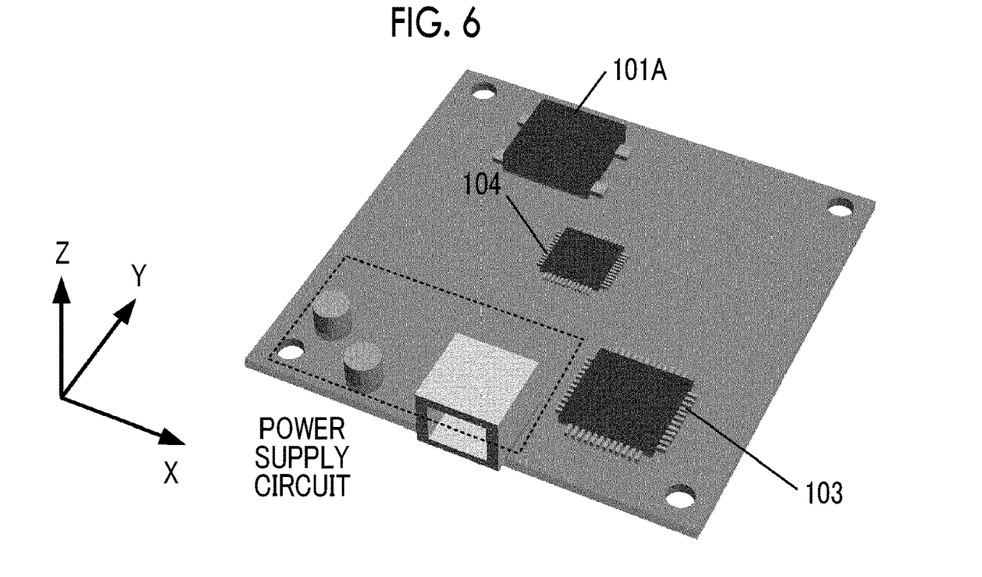
FIG. 6 is a perspective view of a substrate on which each component of a key unit is mounted.

FIG. 6 is a perspective view of the substrate on which each component of the key unit 100 is mounted. In the embodiment, as shown in the drawing, noise sources such as the power supply circuit (and associated parts) and the short-range communication unit 103 are disposed at positions across the microcomputer which is the controller 104 from the LF receiver 101 (specifically LF antenna. Hereinafter, it is shown as LF antenna 101A).

A more specific disposing method will be described. In the following description, the positional relationship between the LF antenna 101A and the short-range communication unit 103 will be mainly described; however, the positional relationship between the LF antenna 101A and the power supply circuit can also be defined in the same manner. In the above described case, the relative positional relationship between the power supply circuit and the short-range communication unit 103 is not particularly limited.

Figure 7:
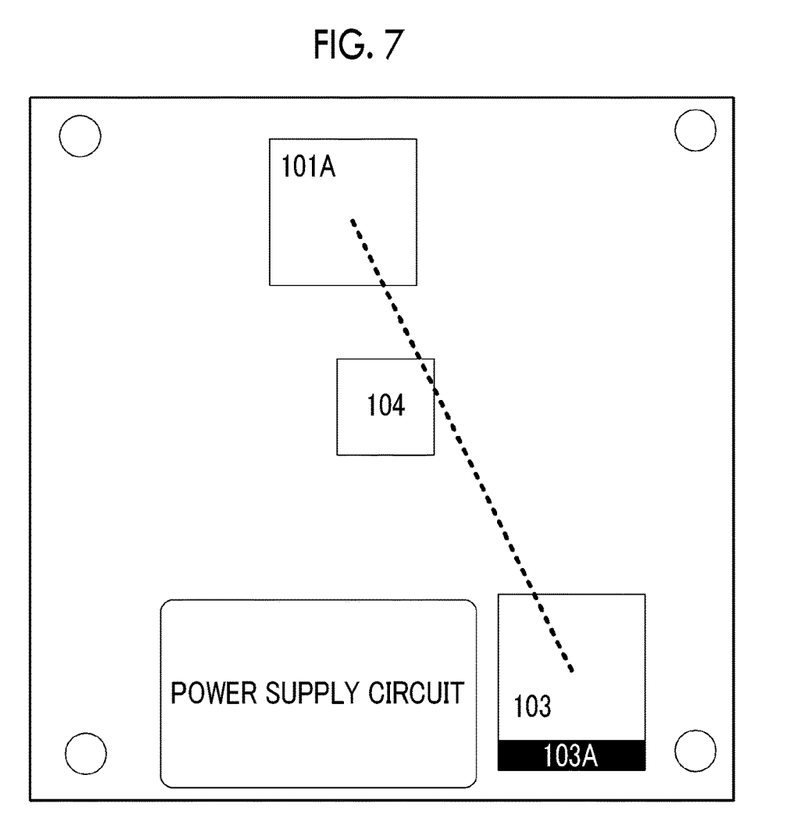
FIG. 7 is a diagram of the substrate observed in a Z axial direction.

FIG. 7 is a diagram of the substrate of the key unit 100 observed in a positive Z axial direction. As shown in the drawing, in the embodiment, the LF antenna 101A, the short-range communication unit 103, and the controller 104 are respectively disposed such that a straight line connecting the center point of the LF antenna 101A and the center point of the short-range communication unit 103 pass at least a part of the controller 104. As shown in the drawing, the components are respectively disposed on the substrate in arrangement order of the LF antenna 101A, the controller 104, and the short-range communication unit 103.

Figure 8:
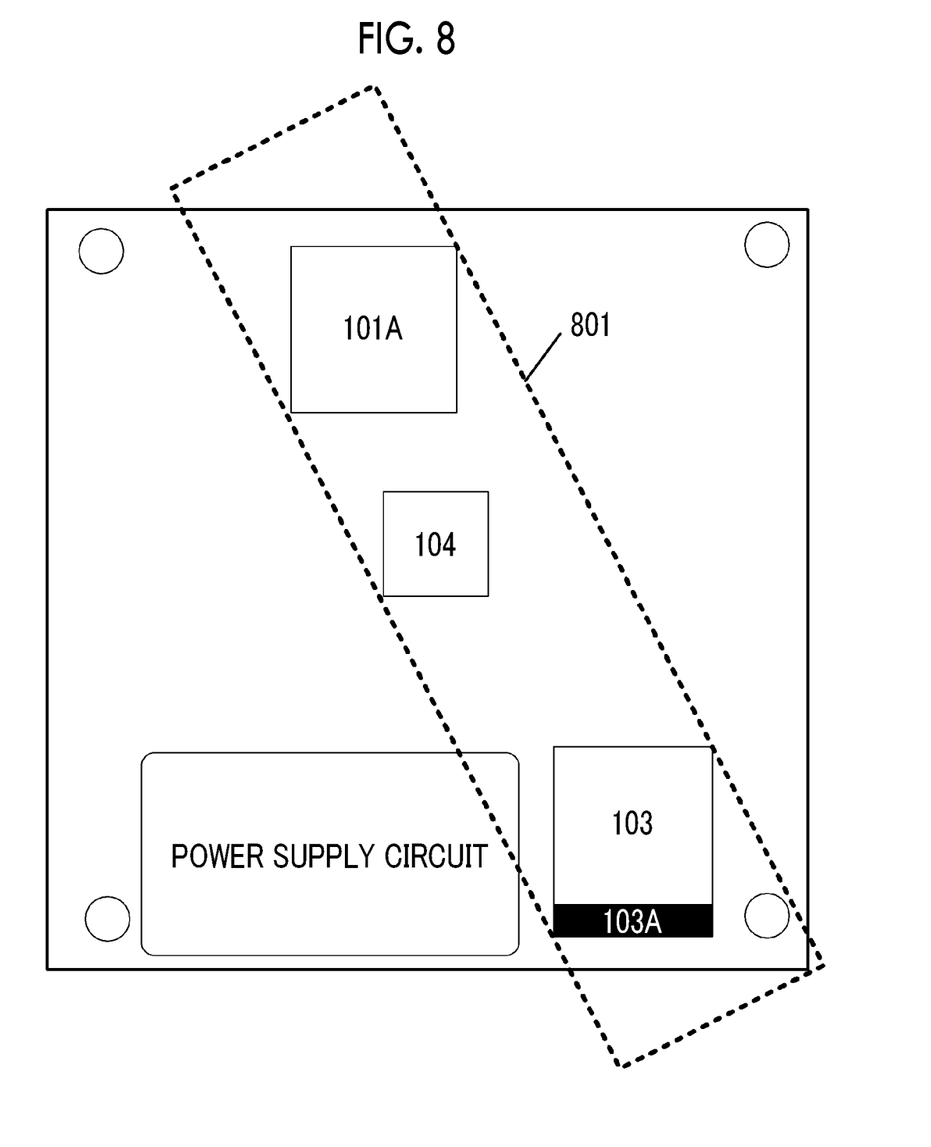
FIG. 8 is a diagram of the substrate according to a modification example observed in the Z axial direction.

FIG. 8 is a diagram for describing a disposing method according to a modification example. As shown in the drawing, in the modification example, the LF antenna 101A, the short-range communication unit 103, and the controller 104 are respectively disposed such that at least a part of the controller 104 is located inside a region 801 where both of the LF antenna 101A and the short-range communication unit 103 are inscribed. The region 801 may be rectangular or trapezoidal.

Figure 9:
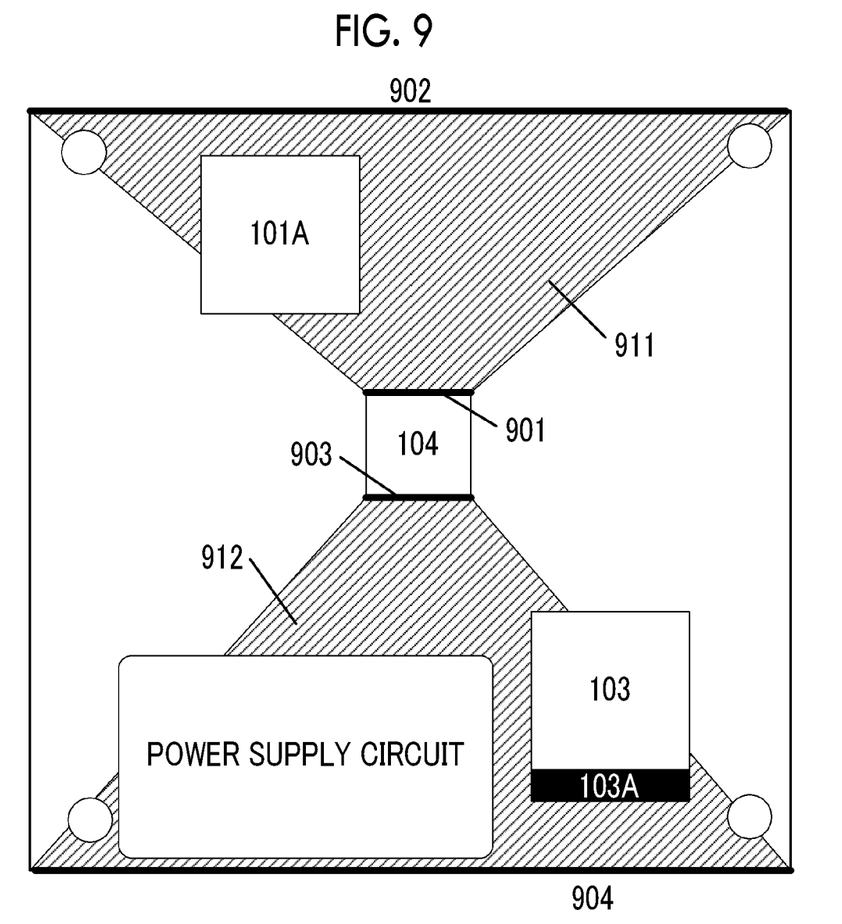
FIG. 9 is a diagram of the substrate according to the modification example observed in the Z axial direction.

FIG. 9 is a diagram for describing a disposing method according to another modification example. In the other modification example, at least a part of the LF antenna 101A is disposed inside a region (hatched region shown by reference numeral 911) surrounded by both end points of the first side (reference numeral 901) of the microcomputer which is the controller 104, and both end points of a side (reference numeral 902) of the substrate facing the first side. At least a part of the short-range communication unit 103 is disposed inside a region (hatched region shown by reference numeral 912) surrounded by both end points of a second side (reference numeral 903) of the microcomputer which is the controller 104, and both end points of a side (reference numeral 904) of the substrate facing the second side.

By disposing the components of the key unit 100 at the positions as shown in FIGS. 7 to 9, it is possible to dispose the short-range communication unit 103 (or power supply circuit), which can be the noise source, and the LF antenna 101A apart from each other. Furthermore, a path connecting the LF receiver 101 and the controller 104, and a path connecting the short-range communication unit 103 and the controller 104 can be made relatively short. As described above, it is possible to obtain an effect that the entering of the noise can be reduced and the communication defect can be reduced.

Figure 10:
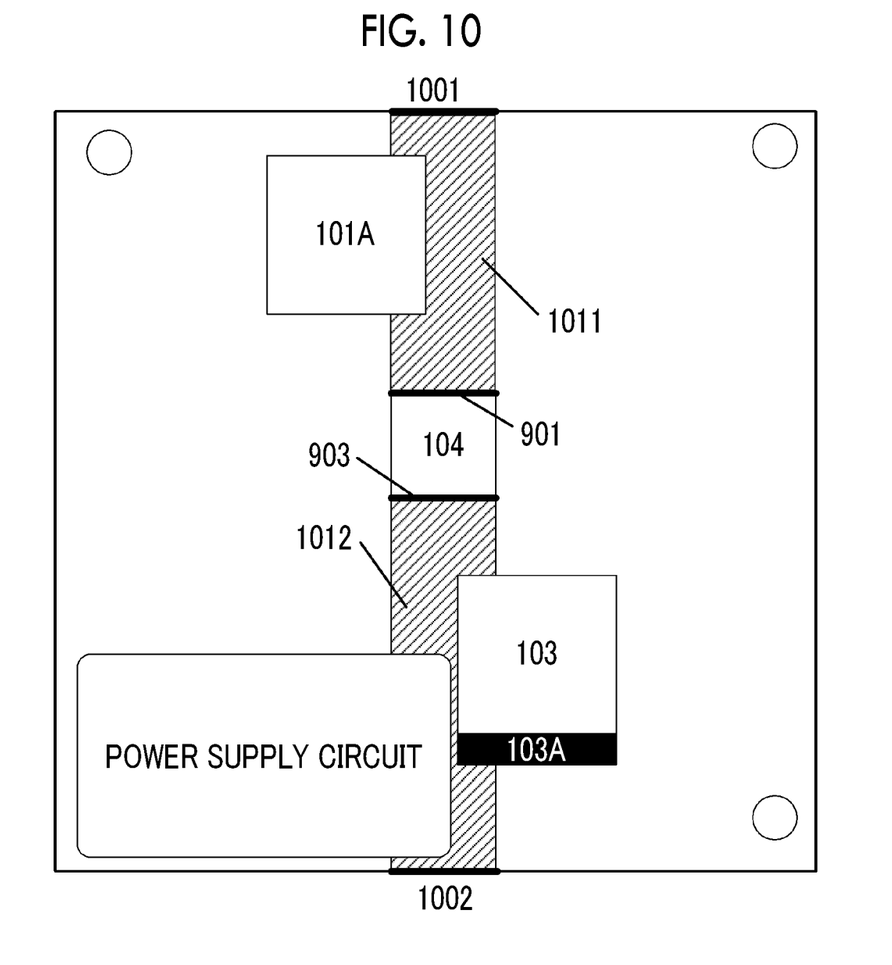
FIG. 10 is a diagram of the substrate according to the modification example observed in the Z axial direction.

FIG. 10 is a view for describing the disposing method according to still another modification example. In the other modification example, at least a part of the LF antenna 101A is disposed inside a rectangular region (hatched region shown by reference numeral 1011) having opposite sides, one side being the first side (reference numeral 901) of the microcomputer which is the controller 104, and the opposite side being a portion (reference numeral 1001) on a side of the substrate facing the first side. At least a part of the short-range communication unit 103 is disposed inside a rectangular region (hatched region shown by reference numeral 1012) having opposite sides, one side being the second side (reference numeral 903) of the microcomputer which is the controller 104, and the opposite side being a portion (reference numeral 1002) on a side of the substrate facing the second side. According to such a disposition, the path connecting the LF receiver 101 and the controller 104, and the path connecting the short-range communication unit 103 and the controller 104 can be made relatively short. That is, while the distance between the LF antenna 101A and the short-range communication unit 103 is maintained to some extent, wiring on the substrate can be made relatively short.

In a case where the short-range communication unit 103 includes an independent antenna, it is useful to dispose the antenna on an outer edge side of the substrate as shown by reference numeral 103A in each drawing. By doing as described above, the distance to the LF antenna 101A can be maintained, and the influence of the noise can be further reduced.

Modification

The above-described embodiment is merely an example, and the disclosure can be appropriately modified and implemented within a scope not departing from the gist of the disclosure.

For example, in the description of the embodiment, the example in which the LF antenna 101A, the power supply circuit, and the short-range communication unit 103 are mounted on one side of the substrate is shown; however, the components may be disposed separately on both sides of the substrate. In a case where components are respectively disposed on both sides of the substrate, the substrate may be a multilayer substrate and a ground layer may be provided in the middle. In doing so, it is possible to suppress propagation of the noise.

Even in a case where components are respectively disposed on both sides of the substrate, it is useful to mount the parts associated with the power supply circuit and the short-range communication unit 103 on the same surface. This is because it is possible to accommodate the short-range communication unit 103 in a gap with a housing, for parts such as an electrolytic capacitor and a connector are relatively tall, for example. The LF antenna 101A, however, is not limited thereto. In a case where the locking and unlocking device 300 is a device that constitutes the smart key system, for linking keys, an operation of bringing the locking and unlocking device 300 and the LF antenna 101A into contact with each other or close to each other may be needed. In other words, by disposing the LF antenna 101A on the surface on a side opposite to a surface on which the parts associated with the power supply circuit are disposed, the operation of bringing the locking and unlocking device 300 and the LF antenna 101A into contact with each other or close to each other may be easy.

In the description of the embodiment, the example in which the key unit 100 performs solely the locking and unlocking of the vehicle is shown; however, the key unit 100 may be caused to perform an operation other than the locking and unlocking. For example, the key unit 100 may communicate with a control device that manages an engine so as to enable an engine start of the vehicle. According to such a configuration, a portable device (electronic key) in the related art possessed by the user can be replaced with the portable terminal.

In the description of the embodiment, the description is made that the key unit 100 receives the polling signal transmitted via the radio waves in the LF band; however, the locking and unlocking signals may not be necessarily transmitted in response to the polling signal. By transmitting the key ID in response to the polling signal, it is possible to cause the locking and unlocking device 300 to recognize that the valid electronic key is inside the vehicle; however, the locking and unlocking signals may be just transmitted via the radio waves in the RF band.

In the description of the embodiment, the key unit 100 controls the locking and unlocking by using the smart key system mounted on the vehicle; however, as long as it is possible to control locking and unlocking by the wireless communication, the locking and unlocking device which is the communication destination of the key unit 100 may use one other than the smart key. For example, a keyless entry system may be used.

The embodiment is merely an example for implementing the disclosure. Therefore, the disclosure is not limited thereto, and may be appropriately modified and implemented within a range not departing from the scope of the disclosure described in the claims.

What is claimed is:

1. A key unit configured to authenticate a portable terminal based on information acquired from the portable terminal and control locking and unlocking of a target by transmitting a signal to a locking and unlocking device, the key unit comprising:
   a first communication unit configured to receive a request signal transmitted in a first frequency band from the locking and unlocking device;
   a controller configured to authenticate the portable terminal and process signals transmitted to and received from the locking and unlocking device;
   a second communication unit configured to perform short-range wireless communication with the portable terminal in a second frequency band; and
   a substrate on which the first communication unit, the controller, and the second communication unit are mounted,
   wherein the first communication unit and the second communication unit are mounted at positions on the substrate such that a straight line connecting the first communication unit and the second communication unit passes through at least part of the controller.

2. The key unit according to claim 1, wherein the second frequency band is a frequency band higher than the first frequency band.

3. The key unit according to claim 1, further comprising a power supply circuit mounted on the substrate.

4. The key unit according to claim 1, wherein:
   the second communication unit has an antenna; and
   the second communication unit is mounted on the substrate such that the antenna is on an outer edge side of the substrate.

5. The key unit according to claim 1, wherein at least a part of the controller is disposed in a region where both of the first communication unit and the second communication unit are inscribed.

6. The key unit according to claim 1, wherein:
   at least a part of the first communication unit is disposed inside a region surrounded by both end points of a first side of the controller, and both end points of a side of the substrate which is on a side of the first side and faces the first side; and
   at least a part of the second communication unit is disposed inside a region surrounded by both end points of a second side of the controller parallel to the first side of the controller, and both end points of a side of the substrate which is on a side of the second side and faces the second side.

7. The key unit according to claim 1, wherein:
   at least a part of the first communication unit is disposed inside a rectangular region having opposite sides, one side being a first side of the controller, and the other side being a side of the substrate which faces the first side of the controller and is on a side of the first side; and
   at least a part of the second communication unit is disposed inside a rectangular region having opposite sides, one side being a second side of the controller parallel to the first side of the controller, and the other side being a side of the substrate which faces the second side and is on a side of the second side.

8. The key unit according to claim 1, wherein the first frequency band is a long wave band.

9. A vehicle comprising:
   the key unit according to claim 1; and
   a locking and unlocking device configured to transmit the request signal in the first frequency band to the key unit, and to control locking and unlocking of the vehicle by a smart key system that receives a response signal transmitted from the key unit in the second frequency band which is a frequency band higher than the first frequency band, the locking and unlocking device being mounted on the vehicle.

10. A key unit configured to authenticate a portable terminal based on information acquired from the portable terminal and control locking and unlocking of a target by transmitting a signal to a locking and unlocking device, the key unit comprising:
    a first communication unit configured to receive a request signal transmitted in a first frequency band from the locking and unlocking device;
    a controller configured to authenticate the portable terminal and process signals transmitted to and received from the locking and unlocking device;
    a second communication unit configured to perform short-range wireless communication with the portable terminal in a second frequency band; and
    a substrate on which the first communication unit, the controller, and the second communication unit are mounted,
    wherein the first communication unit and the second communication unit are mounted at positions on the substrate such that a straight line connecting a center point of the first communication unit and a center point of the second communication unit passes through at least part of the controller.

11. The key unit according to claim 10, wherein the second frequency band is a frequency band higher than the first frequency band.

12. The key unit according to claim 10, further comprising a power supply circuit mounted on the substrate.

13. The key unit according to claim 10, wherein:
the second communication unit has an antenna; and
the second communication unit is mounted on the substrate such that the antenna is on an outer edge side of the substrate.

14. The key unit according to claim 10, wherein the first frequency band is a long wave band.

15. A vehicle comprising:
the key unit according to claim 10; and
a locking and unlocking device configured to transmit the request signal in the first frequency band to the key unit, and to control locking and unlocking of the vehicle by a smart key system that receives a response signal transmitted from the key unit in the second frequency band which is a frequency band higher than the first frequency band, the locking and unlocking device being mounted on the vehicle.

* * * * *

UNITED STATES PATENT AND TRADEMARK OFFICE
CERTIFICATE OF CORRECTION

PATENT NO. : 10,703,335 B2  
APPLICATION NO. : 16/135376  
DATED : July 7, 2020  
INVENTOR(S) : Yasuyuki Tamane, Tsukasa Takahashi and Masaki Oshima It is certified that error appears in the above-identified patent and that said Letters Patent is hereby corrected as shown below:

On the Title Page

Item (72), inventor 1, city, delete "Miyoshi" and insert --Miyoshi-shi Aichi-ken--, therefor.

Item (72), inventor 2, city, delete "Tokyo" and insert --Chiyoda-ku Tokyo--, therefor.

Item (72), inventor 3, city, delete "Aichi-ken" and insert --Niwa-gun Aichi-ken--, therefor.

In the Specification

In Column 5, Line 33, delete "key unit 108." and insert --key unit 100.--, therefor.

In Column 7, Line 50, delete "kicking" and insert --locking--, therefor.

Signed and Sealed this  
Tenth Day of November, 2020

Andrei Iancu  
*Director of the United States Patent and Trademark Office*